Patented Apr. 11, 1950

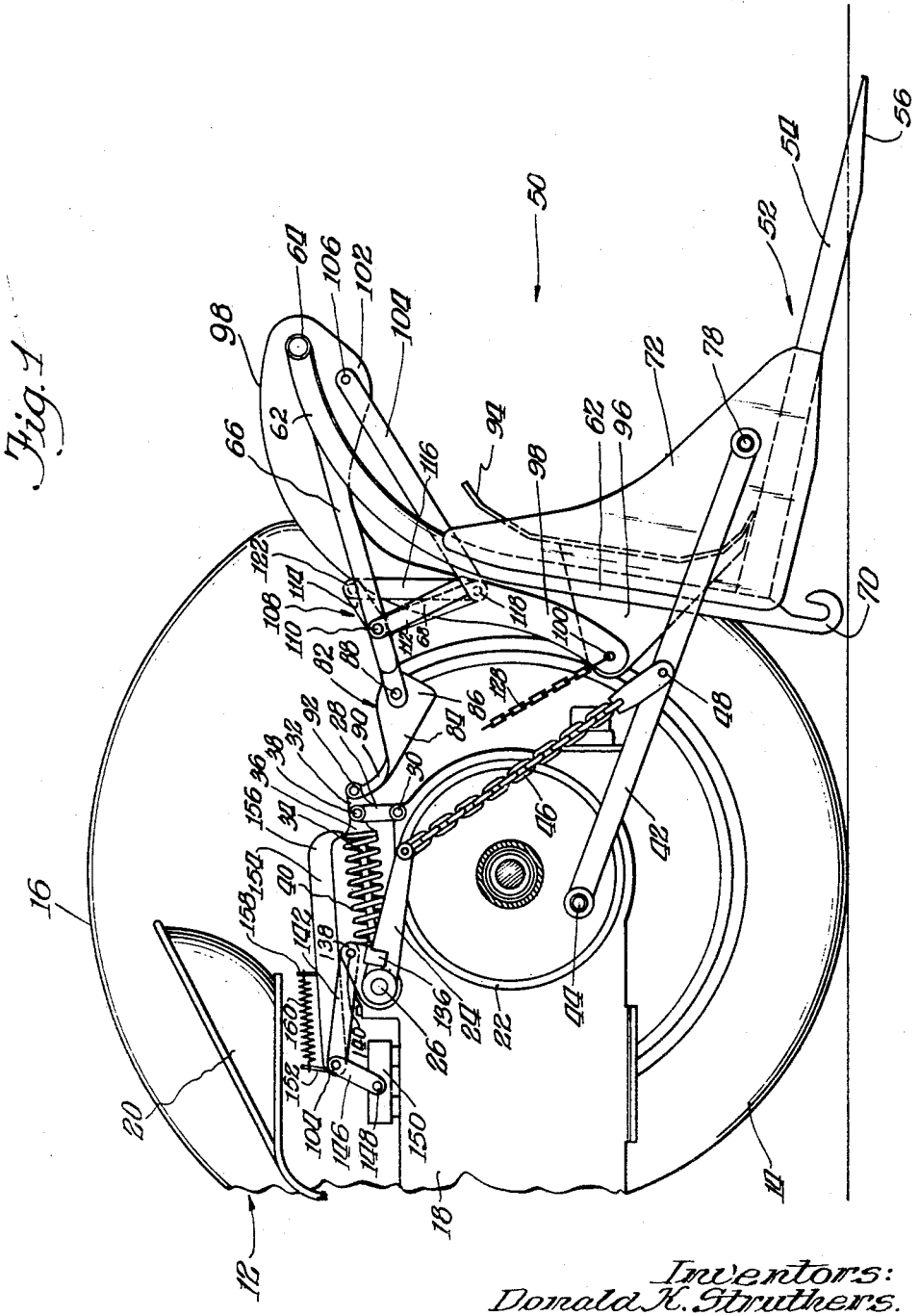

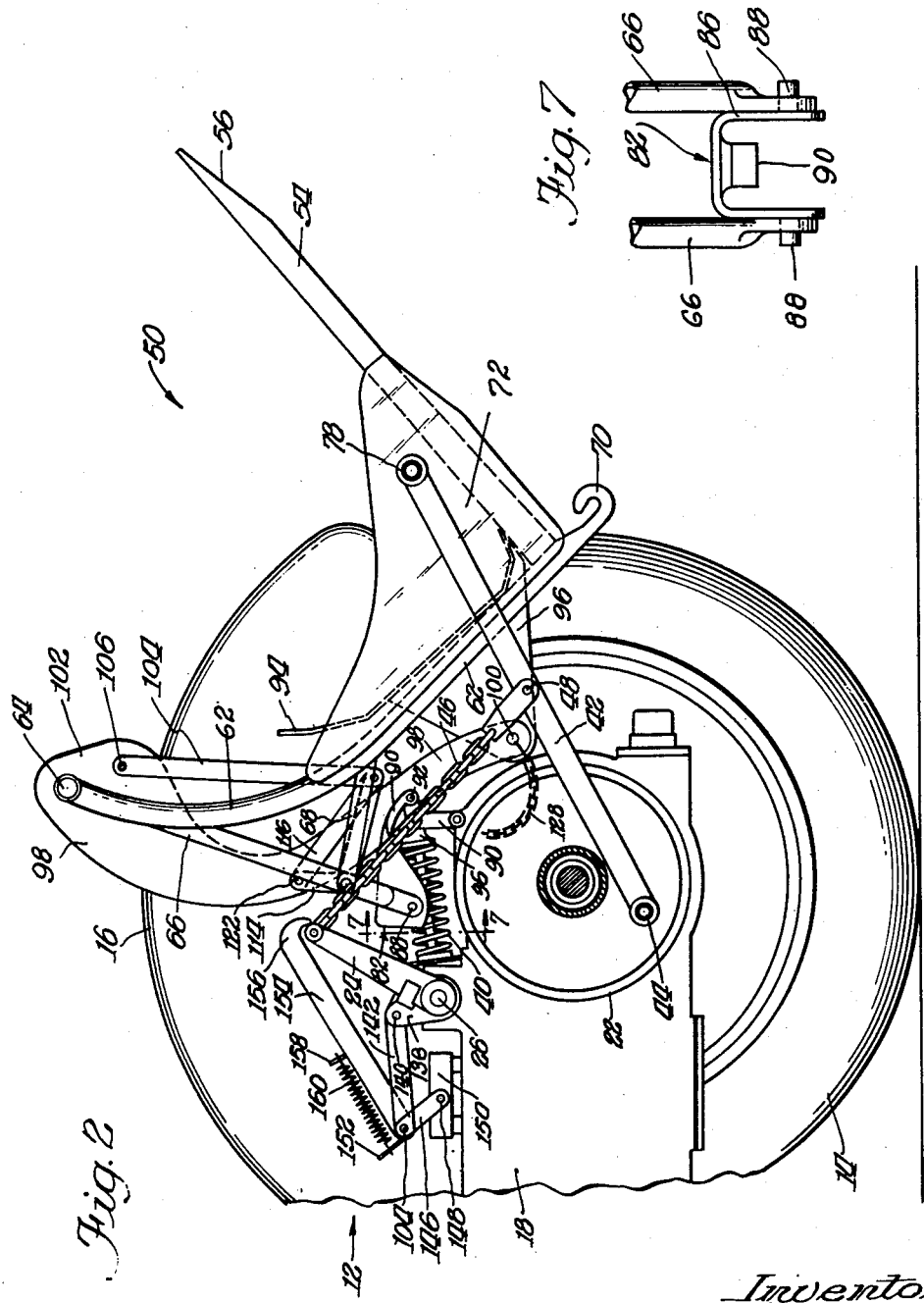

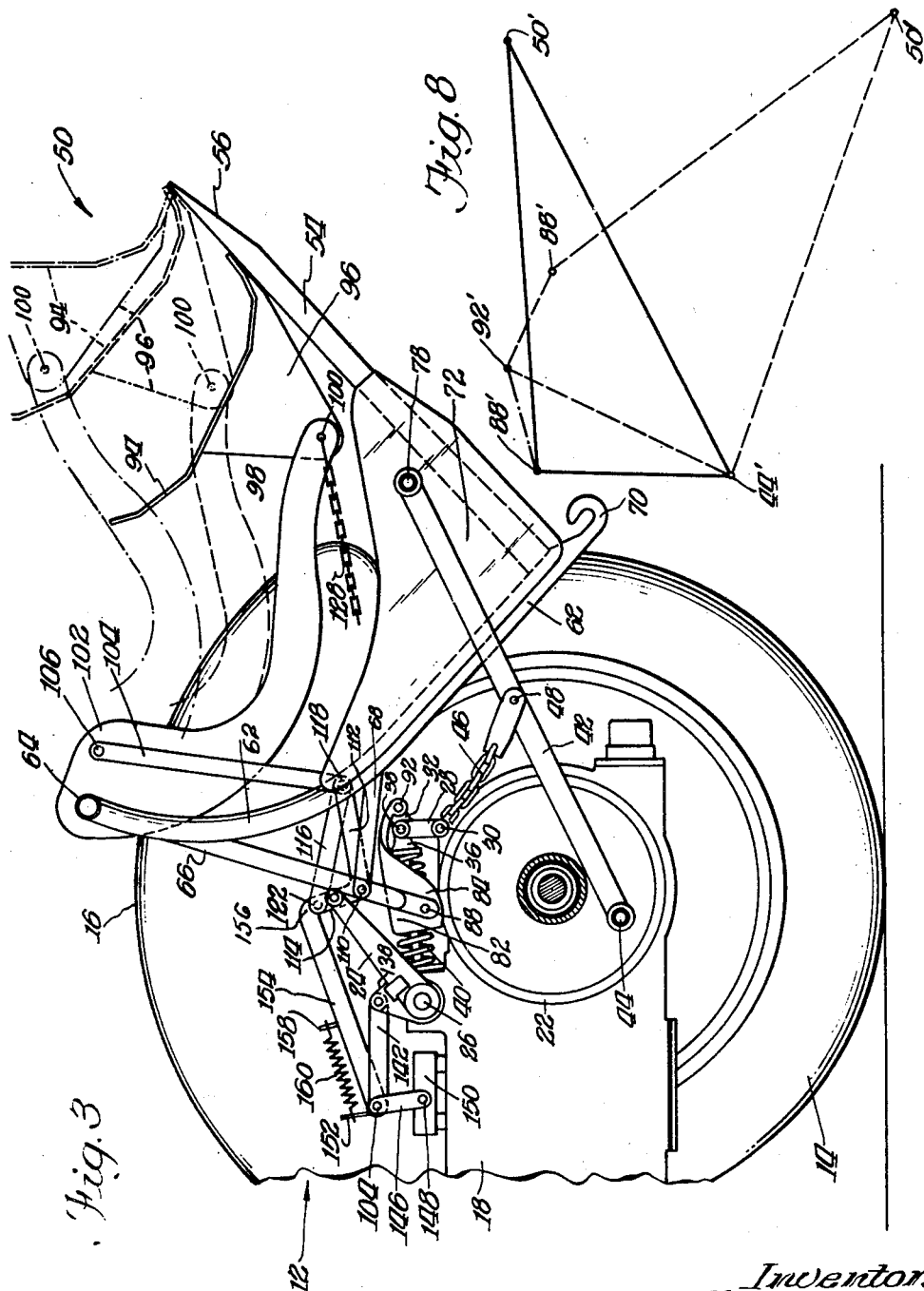

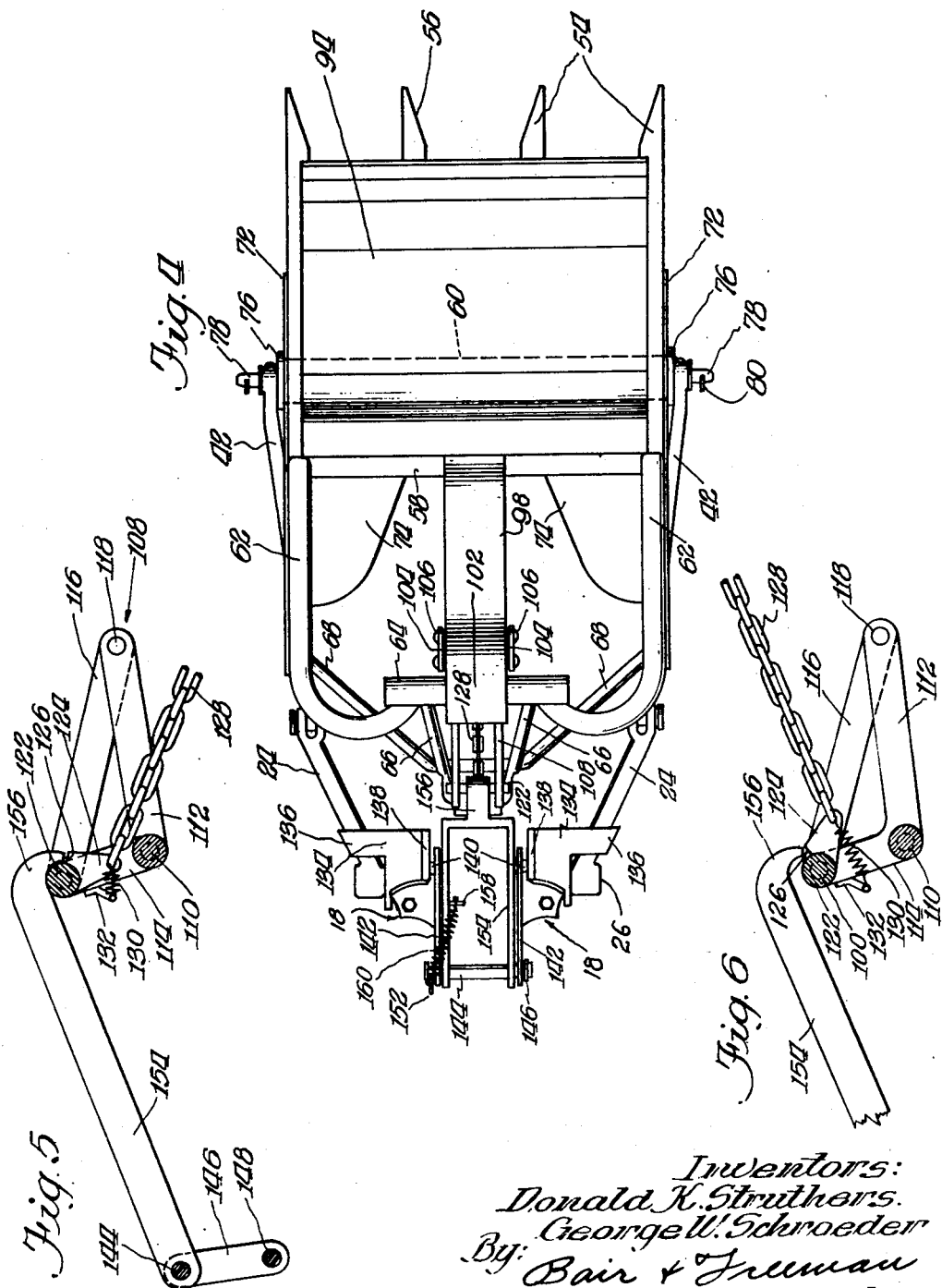

2,503,522

UNITED STATES PATENT OFFICE 2,503,522

TRACTOR MOUNTED MANURE LOADER

Donald K. Struthers and George W. Schroeder,
Des Moines, Iowa

Application August 14, 1947, Serial No. 768,570

15 Claims. (Cl. 214—131)

1

This invention relates to a loader adapted for mounting on a tractor. The device is particularly adapted for use with the Ford tractor.

The device of the present invention is adapted for loading various materials into a wagon or truck, and one of its principal uses is for loading manure into a manure spreader but, of course, it is equally useful for handling other materials.

Many former types of loaders for use on the farm have been cumbersome and difficult to manipulate, together with having the added disadvantage of requiring a great space for their operation. The present invention contemplates a compact loader which can be mounted on the rear of a tractor and is directly under the observation of the operator and more readily under his control.

The device of the present invention requires only a small space for its operation, which is advantageous in confined quarters, such as barns, and requires only a slight amount of lifting for the loading operation so that the device requires only a small amount of head room.

A further advantage of the present invention is that, since the device is attached to the rear of the tractor, it furnishes additional traction for the hind or power wheels of the tractor in the loading operations.

A still further advantage of the device is that it can easily be attached to a tractor and be adapted to the power lift take-off mechanism which is made a standard part of the tractor.

The loader device of the present invention is specially adapted for operation by hydraulic power lift arms of a Ford tractor. The device includes a scoop which is elevated by an initial actuation of the power lift arms, after which the scoop is locked in elevated position and is unloaded when in elevated position by a second actuation of the power lift arms.

An object of the present invention is the provision of a new means for locking the loader scoop in elevated position as described above.

The loader includes an ejector plate which is effective for ejecting the material being handled out of the scoop.

An additional object of the present invention is an improved means for actuating the ejector plate for unloading the scoop.

Still another object is the provision of means whereby when the ejector plate is actuated to its most extended position for unloading the loader, the means for actuating the ejector plate is rendered inactive by such position of the ejector plate.

2

Another object of the invention is the provision of improved means for rendering inactive the means for actuating the ejector plate in the elevating movement of the loader scoop, after which such means again becomes active for actuating the ejector plate.

The locking feature of the loader referred to above is accomplished by the provision of a special toggle link means which controls the action of the loader in its elevating movements, and thereafter assumes a position relative to the tractor frame whereby the frame becomes a supporting means for the loader scoop.

Still another object of the invention is the provision of such toggle link means for loading the loader scoop in elevated position which is easily moved to unlocked position by a slight movement of the scoop by the operator, after which the loader descends to a position for further loading operation.

With these and other objects in view, our invention consists in the construction, arrangement, and combination of the various parts of our device whereby the objects contemplated are attained, as hereinafter more fully set forth, pointed out in the claims, and illustrated in the accompanying drawings, wherein:

Figure 1 is a side elevational view of the loader of the present invention attached to a tractor and in lowered position ready for loading, the tractor being illustrated only partially and with one of the rear wheels removed;

Figure 2 is a view similar to Figure 1, but with the loader in elevated position and before it has been moved to locked position;

Figure 3 is a view similar to Figure 2 but illustrating the device in locked position;

Figure 4 is a plan view of the loader in elevated position, showing the parts thereof which are secured to the tractor frame but omitting the tractor frame itself;

Figure 5 is an enlarged detail view of a portion of the means for actuating the ejector plate;

Figure 6 is a view similar to Figure 5, illustrating the means immediately after being rendered inactive;

Fgure 7 is an enlarged detail view of the special guide link forming a portion of the toggle link locking means for the loader scoop, as viewed approximately from line 7—7 of Figure 2; and Figure 8 is a diagrammatic illustration of the forces involved in the locking feature of the loader device.

Referring now in detail to the drawings, a tractor is indicated generally by the reference numeral 12 and illustrates the rear end of the tractor frame and one rear wheel 14. The other rear wheel is omitted from the drawing to illustrate the device as applied to the tractor. A guard fender 16 covers the rear wheel. The tractor frame as a whole is indicated at 18 and supports a seat 20 in any convenient position and forms an operator's station at the rear of the tractor. The tractor frame 18 also includes a differential housing 22 which forms a supporting surface in the operation of the loader as will be explained later.

Reference will be made herein to the directions "forward" and "rearward," which will be in relation to the corresponding directions of travel of the tractor, forward being to the left of Fig. 1.

The tractor illustrated is the Ford type and includes a power take-off mechanism as standard equipment therewith. The power take-off mechanism includes a pair of power lift arms 24, one on either side of the transmission housing 22 and fixedly secured to a shaft 26 about which the arms 24 pivot. The power lift arms 24 are elevated and lowered by a hydraulic mechanism, the operation of which may be a standard operation and includes operating and control means which may be of any conventional type under the control of the operator of the tractor.

A pair of links 28 are pivoted at points 30 on the differential housing 22 and have upper horizontally extending portions 32 for a purpose which will appear later. A plunger rod 34 is employed for certain operations in the power take-off mechanism and is provided at its outer end with a bracket 36 which is pivoted at 38 to the upper end of the links 28. A compression spring 40 is contained between the bracket 36 and the frame of the tractor adjacent the pivot point 26 of the power lift arms. The plunger 34 and spring 40 are part of the standard power take-off means supplied with the tractor.

A pair of supporting links 42 are secured to the tractor frame 18 and pivoted thereon at 44, one of the links being disposed on either side of the differential housing 22. Flexible connecting means 46, such as link chains, interconnect the extended or swinging ends of the power lift arms 24 and the supporting links 42 at points intermediate the ends of the latter as indicated at 48. The power lift arms 24 in upwardly swinging movements are thereby effective for elevating the supporting links 42.

A scoop 50 forming the major part of the unloading device is mounted on the rear of the tractor. The scoop 50 comprises a rigid frame indicated at 52, in the form of a shovel or fork and comprises a plurality of spaced teeth 54 disposed in a common plane and in parallel relationship. The rear ends of the teeth 54 are tapered as illustrated at 56 to enable the teeth to penetrate the material being loaded more easily. The teeth 54 are secured together at their front end by a cross member 58 and by another cross member 60, both of the latter of which are welded to the teeth 54 to form a rigid bottom element or floor of the scoop 50. The teeth 54 may be of standard angle iron.

Secured to the front end of the outermost teeth 54 are a pair of upwardly extending brace members 62 welded to or otherwise fixedly secured to the teeth. The upper ends of the brace members 62 curve rearwardly and inwardly as illustrated in Figures 1 and 4 and have a cross member 64 fixedly secured to the upper ends thereof. The cross member 64 serves as a bearing support for the ejector plate which will be described later. A pair of arms 66 are rigidly secured to the cross member 64, one adjacent each brace member 62 and extending forwardly and downwardly from the latter. The rigid arms 66 and brace members 62 may be interconnected by rigid anchoring means 68 if desired to provide rigidity to the scoop. The lower ends of the brace members 62 are provided with hook elements 70 for hooking a trailing implement thereonto when the scoop is in elevated position.

A pair of side plates 72 are secured to the front ends of the outside teeth 54 and the brace members 62 as by welding. The side plates 72 form side closure members for the scoop as a whole, for retaining the material in the scoop. Similarly, plates 74 are welded to the cross member 58 and to the bracket members 62 to form front plates for the scoop. The bottom of the scoop formed by the teeth 54 is in the form of a fork having openings between the teeth. If desired, the teeth 54, or bottom surface of the scoop, may be covered by a plate for retaining small particles in the scoop.

The side plates 72 are provided with reinforcing members 76 welded thereto, and extending out from each reinforcing member 76 is a pin 78. The scoop is mounted on the tractor by supporting it in the extended or swinging ends in the supporting links 42. The links 42 are provided with holes into which the pins 78 are inserted, and the links are retained thereon by means of cotter pins 80 or other means desired.

The upper end of the scoop 50 is guided in the elevating movements of the scoop by means of a specially designed guide link 82. Reference may be had to Figure 7 to view the detail construction of the guide link 82. The guide link 82 has a main U-shaped portion 84 having legs 86, which, as illustrated in Figure 1, extend upwardly and in Figures 2 and 7, downwardly. The legs 86 are provided with outwardly extending pins 88 which are inserted in the rigid arms 66 formed on the scoop, and which furnish a pivot point between the guide link 82 and the scoop. The pins 88 may be formed rigid with the legs 86 and inserted in the arms 66 in the construction of the device or, if desired, removable means may be provided for attaching the link 82 to the arms 66 after the main part of the scoop has been constructed. Extending from the U-shaped portion 84 of the guide link 82 in the direction opposite the legs 86 is a neck portion 90 having a hole in the extended end for receiving a pin 92, the latter being also received in the horizontally extending portions 32 on the links 28. The pin 92 therefore provides a pivot connection between the guide link 82 and, through the links 28, the frame of the tractor.

The ejector plate referred to above for ejecting the load of material from the scoop is shown at 94. The ejector plate 94 may be a single sheet of metal extending across the scoop 50 and having its upper and lower margins bent rearwardly toward the open end of the scoop. The lower edge of the ejector plate 94 may rest and ride along the teeth 54. Extending forwardly from the ejector plate 94 are a pair of ears or vertical plates 96 between which is pivoted the lower end of a swinging arm 98, the pivot point therebetween being indicated at 100. The swinging arm 98 has a characteristic curve to compensate for the curvature of the brace members 62, and the upper end of the arm 98 is pivoted on the cross member or bearing member 64 which is supported by the upper ends of the brace members 62.

When the ejector plate is in retracted position, as illustrated in Figure 1, or toward the front or closed end of the scoop, the upper end of the arm 98 extends over and rearwardly from the ejector plate 94. The upper end of the swinging arm 98 is provided with an enlargement 102 adjacent the pivot point or cross member 64 for supporting a pair of actuating links 104. The links 104 are pivoted in the enlargement in any convenient manner, such as by means of rivets 106.

A bell crank referred to generally at 108 is pivoted in the rigid arms 66 at pivot point 110 and comprises arm 112 and 114, the outer ends of which are interconnected by a reinforcing brace member 116. The bell crank 108 is actually made of two spaced elements, one adjacent each of the rigid arms 66. The lower and rear ends of the actuating links 104 are pivoted at point 118 in the extended and swinging ends of the arms 112 of the bell crank 108.

The extended and swinging ends of the arms 114 of the bell crank 108 support a roller 122 therebetween (Figures 5 and 6). The roller may be a shaft, or instead, a separate pin and roller element may be provided. The roller 122 is provided with a lug 124 disposed substantially centrally thereof and fixedly secured thereto as by means of welding. The lug 124 is provided with an upwardly facing shoulder 126 on the side of the roller toward the scoop and when the lug 124 is extended downwardly, the surface or shoulder 126 is disposed below the center of the roller 122 (Figure 5).

A chain 128 or other flexible means interconnects the lower end of the lug 124 and the ejector plate 94, being secured to the latter preferably on one of the ears 96 or an extension of the pivot point 100 between the ejector plate and the swinging arm 98. The lower end of the lug 124 is provided with a tension spring 130, the other end of which is secured to a bracket 132 which in turn is secured to one of the arms 114 of the bell crank 108.

The shaft 26 is provided with arms 134 thereon, one disposed inwardly of each of the power lift arms 24 and each having an outwardly extending lug 136, depending over the respective power lift arm 24. The arms 134 are adapted to be rotated with the shaft 26 in response to the motions of the power lift arms 24; if desired, the arms 134 may be fixedly secured to the shaft 26. Each of the arms 134 is provided with a generally upwardly extending portion 138. Extending inwardly from each of the upstanding portions 138 is a pin 140 pivotally supporting one end of a generally horizontal and forwardly extending link 142, there being one link 142 for each arm 134. The forward ends of the links 142 are provided with a pin 144 which is pivoted in a pair of generally upstanding links 146, the lower ends of the latter being pivoted at 148 in a block 150 which is supported by the tractor frame 18. One of the upstanding links 146 is provided with an extension 152 projecting above the pin 144.

A hook member 154 is pivoted on the pin 144 and extends rearwardly therefrom. The hook member 154 may be of a yoke or U-shaped formation, as illustrated in Figure 4, and has at its rear end a hook element 156 which is adapted to engage the roller 122. The hook member 154 is provided with an upstanding projection 158 disposed intermediate the ends of the hook member, and a tension spring 160 is interconnected between the projection 158 and the extension 152.

Figure 8 will be referred to in detail in the subsequent portion of the specification referred to as "Use and operation."

Use and operation

The scoop 50 is shown in Figure 1 in its lowermost position, wherein it will be seen that the rear ends of the teeth 54 are sloping downwardly and rearwardly and rest on the ground or other supporting surface for the tractor. Figure 1 illustrates the points of the teeth below the surface of the ground, this illustration being exaggerated to indicate that the teeth may rest on the ground or dig thereinto slightly. The supporting links 42 for supporting the scoop 50 are lowered and, of course, the power lift arms 24 are also lowered, the latter having been depressed to permit the scoop to lower. When the power lift arms 24 are in their lowermost positions, the chains 26 are in slackened condition and, as illustrated in Figure 1, the power lift arms 24 and the chains 46 are in the position at the beginning of the elevating movement. Also, in the lowermost position of the scoop 50, the upper portion of the scoop is tilted rearwardly of the tractor, or to the right as illustrated in Figure 1, and, in this position, the guide link 82 is extended rearwardly of the tractor. In this position of the scoop, the operator backs the tractor, running the ends of the teeth 54 of the scoop into the pile of manure or other material to be loaded. The rearwardly sloping position of the teeth enables the scoop to more easily tear the material from the pile and thereafter lift the loaded portion.

The operator actuates the power lift mechanism of the tractor by which the power lift arms 24 are elevated, or rotated counterclockwise, as viewed in Figures 1, 2, and 3. The lifting operation continues to the position of the scoop illustrated in Figure 2 by elevating the supporting links 42 which in turn elevate the scoop 50 as a whole. In the elevating movement, the guide link 82 is rotated counterclockwise and swings up over on top of the differential housing 22 of the tractor. Figure 2 illustrates the uppermost position of the scoop after which the upper end of the scoop continues to rotate slightly, whereby the swinging end of the guide link 82 swings down into engagement with the differential housing 22 and is supported thereby. In the latter movement, the scoop as a whole does not continue elevating but pivots about the pivot point 78, the upper end of the scoop swinging to the left and finally reaching a resting position when the guide link 82 rests solidly on the differential housing 22. The legs 86 of the guide link 82 straddle the spring 40.

The position of the scoop which has thus been reached as above described is in locked position. The scoop is supported at the two points 78 and 88, the former being the pivot point between the supporting links 42 and the scoop, and the latter being the pivot point between the rigid arms 66 and the guide link 82. These two points, 78 and 88, are then below the point 92 which is the pivot point between the guide link 82 and the link 28. The scoop has reached a stable position since the points 78, 88, and 92 are not in a common plane, but the two outer ones are below the center one.

The action of the locking feature which locks the scoop in elevated position is illustrated diagrammatically and effectively in Figure 8. Figure 8 illustrates in dotted lines a polygon, the lines of which interconnect certain points. These points are 50' which represents the load in the scoop 50; 44' which represents the point 44 forming the pivot point between the supporting links 42 and the tractor frame; 92' which represents the pivot point 92 or the point of connection between the guide link 82 and the tractor frame; and point 88' represents the pivot point 88 or the point of connection between the scoop and the guide link 82. The figure in dotted lines in Figure 8 represents the scoop free to be elevated.

When the scoop is elevated and locked as described above and as illustrated in Figure 3, a condition arises which is represented by the triangle in full lines in Figure 8. In the latter case, the pivot point 44' remains fixed, and the point 50', or the load, is elevated to the position indicated. The point 92', which represents the pivot point 92, remains fixed, and the point 88' swings about the point 92' over to the position indicated in full lines. It will thus be seen that with the point 44' remaining fixed, and the load bearing down at 50', the scoop is locked in elevated position due to the fact that the point 88' cannot swing above the point 92', since the points 50' and 88' are both below the fixed point 92'.

With the scoop thus locked, the power lift arms 24 can be lowered, this movement being permitted by the flexibility of the chains 46. The next operation after the scoop has been elevated and locked is to operate the ejector plate 94 and eject the load of material from the scoop.

In the initial elevating movement of the scoop 50, the power lift arms 24 rotate counterclockwise, moving the links 142 forwardly which in turn moves the hook member 154 forwardly. At the same time, the upstanding links 146 are rotated about the pivot points 148 counterclockwise, which swings the extension 152 forwardly. This swinging of the extension 152 tensions the spring 160 which swings the hook member 154 counterclockwise about the pivot or pin 144 to the position illustrated in Figure 2, enabling the swinging end of the guide link 82 to pass under the hook element 156. After the scoop has reached its locked position, illustrated in Figure 3, the power lift arms 24 are lowered, the latter movement swinging the links 146 and extension 152 clockwise, releasing the tension on the spring 160 and permitting the hook member 154 to rotate clockwise also. The same downward movement of the power lift arms 24 moves the hook member 154 rearwardly or toward the scoop. The position of the hook element 156 in its uppermost position is above the roller 122 when the scoop is in locked position. When the power lift arms 24 are thus lowered after the scoop is locked, the hook member 154 moves rearwardly and is lowered and the hook element 156 hooks over the roller 122.

The next operation is effective for extending the ejector plate 4 outwardly or rearwardly along the teeth 54. The power lift arms 24 are elevated which draws the hook member 154 forwardly of the tractor, as described above, but, in this operation, the hook element 156 is in engagement with the roller 122. Before the tension spring 160 becomes effective for rotating the hook member 154, the hook element 156 engages the roller 122 and the hook member is thereby prevented from swinging about its pivot 144 under the influence of the spring 160. A line drawn between the center of the pin 144, and the lowermost point of the hook element 156 (Figure 5) falls below the center of the roller 122 whereby the force pulling the hook member 154 forwardly of the tractor is in a direction to retain the hook element 156 on the roller 122.

Continued lifting of the lower lift arms 24 draws the hook member 154 forwardly which, being in engagement with the roller 122, rotates the crank arm 108 swinging the point 118 counterclockwise, which in turn actuates the actuating links 104. The links 104 acting through the enlargement 102 on the swinging arm 98 rotates the latter clockwise about the cross member 64. This swinging of the arm 98 pushes the ejector plate rearwardly over the teeth 54 to extended position which is shown at the farthest right in Figure 3. The ejector plate 94 is shown in full lines in Figure 3 in one of its intermediate positions, and in dotted lines in several other positions, from which it will be seen that the ejector plate is positioned generally perpendicular to the teeth throughout most of its range of extension, varying somewhat from one position to the next until, in its final position, the ejector plate is disposed approximately perpendicular to the supporting surface for the tractor. The load of material on the loader is thus pushed off of the scoop by the ejector plate.

When the ejector plate 94 reaches its outermost position illustrated in Figure 3, the chain 128 pulls the lug 124, rotating the latter counterclockwise. When the lug 124 is thus rotated, the shoulder 126 forces the hook element 156 off of the roller 122 which disengages the hook from the actuating mechanism for the ejector plate. The ejector plate then goes back to retracted position by the action of gravity.

To lower the scoop 50 for the next loading operation, the operator merely pushes rearwardly on the upper portion of the scoop, for example on the cross member 64, lifting the guide link 82 so that the pivot point 88 is above the pivot point 92 after which the scoop will lower of its own accord upon the power lift arms 24 being lowered.

In many types of previous loaders, it was necessary to tilt the scoop when it was elevated in order to unload it. Such an arrangement required greater head room and in many cases greater structure extending outwardly from the tractor. In the present case, the scoop needs to be elevated only a short distance and the load is ejected therefrom without the necessity of tilting the scoop. The uppermost point reached by any portion of the scoop is not substantially higher than when in lowered position due to the fact that as the scoop is being elevated it is also rotated which reduces the effective range of elevating.

Although the device is primarily designed for loading manure into manure spreaders, it is obvious that other material may be handled as well, as for exampule, in handling earth. Also, a bottom plate can be secured over the teeth 54 forming a tight closure so grain can be handled as well as other materials.

The device is simple in construction resulting in an economical article of manufacture. The device is also easily attached to and detached from the tractor, and its operation is exceedingly simple. There are few moving parts so as to reduce wear as much as possible, and these moving parts are rugged which insures their long lasting qualities.

While we have herein shown and described a preferred embodiment of our invention, manifestly it is susceptible of modification and rearrangement of the parts without departing from the spirit and scope thereof. We do not, therefore, wish to be understood as limiting our invention to the precise form herein disclosed, except as we may be so limited by the appended claims.

We claim as our invention:

1. A loader for a tractor having a power take-off mechanism including a power lift arm, and a supporting link pivoted for vertical swinging on the tractor frame, said loader comprising, in combination, a rigid load lifting frame pivoted in the outer end of said supporting link, said load lifting frame having a guide arm extending toward the tractor, a guide link having one end pivoted on the tractor frame, the other end of said guide link being vertically swingable and pivoted in said guide arm, and means interconnecting said power lift arm and said supporting link, said power lift arm being operable to swing said supporting link upwardly and thereby elevate said load lifting frame, the swinging end of said guide link being extended from the tractor frame when the load lifting frame is lowered and being extended over the tractor frame and adapted to rest thereon when the load lifting frame is elevated, said guide link when resting on the tractor frame solidly supporting said guide link and thereby supporting the load lifting frame against rotation about its pivot point in said supporting link.

2. A loader for a tractor having a power take-off mechanism including a power lift arm, and a supporting link pivoted for vertical swinging on the tractor frame, said loader comprising, in combination, a load lifting frame pivoted adjacent its lower portion in the outer end of said supporting link, means interconnecting said power lift arm and said supporting link, said power lift arm being adapted to act through said supporting link and elevate the load lifting frame, and toggle link means interconnecting the tractor frame and the upper portion of the load lifting frame, said toggle link means controlling the swinging movements of the load lifting frame about its pivot point in said supporting link in the elevating movements of the load lifting frame, and said toggle link means adapted to lock the load lifting frame in elevated position.

3. A loader for a tractor having a power take-off mechanism including power lift arms, and supporting links pivoted on the tractor frame, said loader comprising, in combination, flexible means interconnecting said power lift arms and said supporting links, a scoop pivoted in the outer end of said supporting links, an ejector plate pivoted in the scoop, linkage for controlling said ejector plate, and togle link means interconnecting the tractor frame and the scoop, said power lift arms being operable to swing said supporting links and elevate the scoop, said toggle link means being operable to lock the scoop in elevated position, said power lift arms being operable to actuate said linkage and operate said ejector plate when the scoop is in elevated and locked position.

4. A loader for a tractor having a power take-off mechanism including power lift arms, and supporting links pivoted on the tractor frame, said loader comprising, in combination, flexible means interconnecting said power lift arms and said supporting links, a scoop pivoted in the outer end of said supporting links, an ejector plate pivoted in the scoop, linkage for controlling said ejector plate, toggle link means interconnecting the tractor frame and the scoop, said power lift arms being operable to swing said supporting links and elevate the scoop, said toggle link means being operable to lock the scoop in elevated position, said power lift arms being operable to actuate said linkage and operate said ejector plate when the scoop is in elevated and locked position, and means interconnecting said ejector plate and said linkage whereby said ejector plate at one position is operable to disconnect said linkage from operable association with said power lift arms.

5. A loader for a tractor having a power take-off mechanism including power lift arms comprising, in combination, a scoop pivoted on the tractor frame, flexible means interconnecting said power lift arms and the scoop, said power lift arms being operable for elevating the scoop, an ejector plate pivoted in the scoop and adapted to move from retracted to extended positions, means for locking the scoop in elevated position, linkage mounted in the scoop having operable connection with said ejector plate, hook means pivotally mounted on the tractor frame and adapted to engage said linkage, said hook means having operable connection with said power lift arms, said power lift arms being operable to actuate said hook means and thereby actuate said linkage and move said ejector plate to extended position, and means interconnecting said ejector plate and said linkage whereby said ejector plate is operable in its extended position to release said hook means from engagement with said linkage.

6. A loader for a tractor having a power take-off mechanism including power lift arms, and supporting links pivoted on the tractor frame, said loader comprising, in combination, a scoop pivotally supported in the swinging ends of said supporting links, said power lift arms having operable connection with said supporting links and being operable thereby to elevate the scoop, a rigid arm on the scoop extending toward the tractor frame and a guide link pivoted on the tractor frame and having its swinging end pivoted in said arm, said guide link being extended away from the tractor frame when the scoop is lowered and being extended over the tractor frame when the scoop is elevated, the swinging end of said guide link resting on the tractor frame and establishing a locked condition when the scoop is elevated, the pivot point between said guide link and said arm and the pivot point between the scoop and said supporting links being on a line below the pivot point between said guide link and the tractor frame when said locked condition exists.

7. A loader for a tractor having a power take-off mechanism including lower lift arms, and supporting links pivoted on the tractor frame, said loader comprising, in combination, a load lifting frame pivotally supported adjacent its lower portion in the swinging ends of said supporting links, said power lift arms having operable connection with said supporting links and being operable thereby to elevate the load lifting frame, a guide link interconnecting the tractor and load lifting frame and providing a floating pivot connection between the load lifting frame and the tractor frame, the extended end of the load lifting frame being at a downwardly inclined angle with the ground when lowered and being at an upwardly inclined angle when elevated, said guide link controlling the positions of rotation of the load lifting frame about its pivot point in said supporting links and being operable to lock the load lifting frame in elevated position, said load lifting frame, when locked in elevated position, being supported solely by said guide link and supporting links.

8. A loader for a tractor having a power take-off mechanism including vertically swingable power lift arms comprising in combination, a scoop pivoted on the tractor frame and adapted to swing from a lowered position to an elevated position, flexible means interconnecting said power lift arms and the scoop, toggle link means interconnecting the scoop and the tractor frame and adapted to lock the scoop in elevated position, an ejector plate pivoted in the scoop movable from retracted position to extended position. linkage carried by the scoop for moving said ejector plate to extended position, hook means on the tractor frame having operable connection with said power lift arms and adapted to engage said linkage, said power lift arms being operable on one upwardly swinging motion to elevate the scoop to a position where said toggle link means moves to locking position, and on a second upwardly swinging motion to actuate said hook means and thereby said linkage to move said ejector plate to extended position, and means interconnecting said ejector plate and said linkage whereby said ejector plate in extended position is operable for disconnecting said linkage from operable association with said hook means.

9. A loader for a tractor having a power take-off mechanism including vertically swingable power lift arms comprising, in combination, a scoop pivoted on the tractor frame and adapted to swing from a lowered position to an elevated position, flexible means interconnecting said power lift arms and the scoop, toggle link means interconnecting the scoop and the tractor frame and adapted to lock the scoop in elevated position, an ejector plate pivoted in the scoop movable from retracted position to extended position, linkage carried by the scoop for moving said ejector plate to extended position, hook means on the tractor frame having operable connection with said power lift arms and adapted to engage said linkage, and spring means connected to said hook means and being responsive to the movements of said power lift arms, said power lift arms being operable on one upwardly swinging motion to elevate the scoop to a position where said toggle link means moves to locking position, said spring means being operable to bias said hook means out of position for engagement with said linkage on said one upwardly swinging motion, and said power lift arms being operable on a second upwardly swinging motion to actuate said hook means and thereby said linkage to move said ejector plate to extended position, said spring means being ineffective for biasing said hook means out of position for engagement with said linkage on said second upwardly swinging motion.

10. A loader for a tractor having a power take-off mechanism including power lift arms comprising, in combination, a scoop pivoted on the tractor and swingable to lowered and elevated positions, flexible means interconnecting said power lift arms and the scoop, means for locking the scoop in elevated position, an ejector plate pivoted in the scoop and movable from retracted position to extended position, linkage on the scoop operable to move said ejector plate, and hook means mounted on the tractor frame for swinging movement and for generally translatory movement and being interconnected with said power lift arms, the swingable end of said hook means being movable into and out of operable engagement with said linkage, said power lift arms being operable to move said hook means generally translationally and thereby actuate said linkage when said hook means is in engagement with said linkage and thereby move said ejector plate to extended position, and spring means operable to bias said hook means in a swinging motion out of engagement with said linkage, the friction between said hook means and linkage being sufficient, during the operation of moving said ejector plate to extended position, to prevent said spring from moving said hook means out of engagement with said linkage.

11. A loader for a tractor having a power take-off mechanism including power lift arms, comprising, in combination, a scoop pivoted on the tractor and swingable to lowered and elevated positions, flexible means interconnecting said power lift arms and the scoop, means for locking the scoop in elevated position, an ejector plate pivoted in the scoop and movable from retracted position to extended position, linkage on the scoop operable to move said ejector plate, a link pivoted on the tractor frame, hook means pivoted on said link, an extension on said link extending beyond the pivot point of said hook means therein, spring means interconnecting said extension and said hook, means interconnecting said link and said power lift arms, said hook means being engageable with said linkage, said power lift arms being operable to swing said link and move said hook means translationally and thereby actuate said linkage for moving said ejector plate to extended position, said spring means being operable, when said link is so swung, to bias said hook means out of position for engagement with said linkage.

12. A loader for a tractor having a power take-off mechanism including power lift arms, comprising, in combination, a scoop pivoted on the tractor and swingable to lowered and elevated positions, flexible means interconnecting said power lift arms and the scoop, means for locking the scoop in elevated position, an ejector plate pivoted in the scoop and movable from retracted position to extended position, linkage on the scoop operable to move said ejector plate, said linkage having a rotatable roller, a radial lug extending from said roller, connecting means interconnecting said lug and said ejector plate, and hook means pivoted on the tractor frame and having operable connection with said power lift arms, said hook means being engageable with said roller, said power lift arms being operable to actuate said hook means and thereby said linkage for moving said ejector plate to extended position, said ejector plate, on reaching extended position and acting through said connecting means and lug, rotating said roller, said lug, on rotation of said roller, engaging said hook means and unhooking the latter from said roller.

13. A loader for a tractor having a power take-off mechanism including supporting links pivoted on the tractor, said loader comprising, in combination, a scoop pivotally supported in the swinging ends of said supporting links, means interconnecting said power take-off mechanism and scoop for elevating the latter, and a guide link pivoted on the tractor frame at a point above the adjacent top surface of the frame, the swinging end of said guide link being pivoted in the scoop, the swinging end of said guide link being adapted to rest on the tractor frame when the scoop is elevated, said guide link when the scoop is elevated establishing a locked condition, the pivot point between said guide link and scoop being below the pivot point between said guide link and tractor frame when said locked condition exists.

14. A device of the class described for use with a tractor having a power take-off mechanism including power lift arms, and supporting links pivoted on the tractor frame for vertical swinging, said loader comprising, in combination, a load lifting frame pivoted at its lower portion in the swinging ends of said supporting links, a guide link pivoted at one end on the tractor frame and at the other end in the upper portion of said load lifting frame, said guide link being substantially shorter than said supporting links, said power lift arms being operable to lift said supporting links and thereby raise said load lifting frame, the swinging end of said guide link being extended from the tractor when the load lifting frame is in lowered position and being over and resting on the tractor frame when the load lifting frame is in raised position.

15. A loader for a tractor having a power take-off mechanism, and supporting links pivoted on the tractor for vertical swinging, said loader comprising, in combination, a scoop supported in the swinging ends of said supporting links and thereby adapted to be raised and lowered, means interconnecting said power take-off mechanism and scoop for elevating the latter, means for locking the scoop in elevated position, an arm pivoted for swinging movement in the scoop, an ejector plate pivoted on said arm and adapted to move along the scoop on swinging of said arm, a bell crank mounted in the scoop, link means interconnecting said bell crank and said arm, hook means movably mounted on the tractor, said bell crank being remote from said hook means when the scoop is lowered and adjacent the hook means when the scoop is elevated, said hook means being movable into operable engagement with said bell crank when the scoop is elevated, and means operably interconnecting said power lift arms and hook means, said power lift arms being operable to move said hook means and thereby actuate said bell crank for swinging said arm and moving said ejector plate along the scoop.

DONALD K. STRUTHERS.
GEORGE W. SCHROEDER.

REFERENCES CITED

The following references are of record in the file of this patent:

UNITED STATES PATENTS

| Number | Name | Date |
| --- | --- | --- |
| 2,330,847 | Seal | Oct. 5, 1943 |
| 2,397,045 | Richey | Mar. 19, 1946 |
| 2,397,046 | Richey | Mar. 19, 1946 |
| 2,433,019 | Arps | Dec. 23, 1947 |